Dec. 31, 1957  K. T. WHITBY  2,817,970
APPARATUS FOR DETERMINING THE PARTICLE SIZE DISTRIBUTION
OF FINELY DIVIDED MATERIALS
Filed Jan. 2, 1953
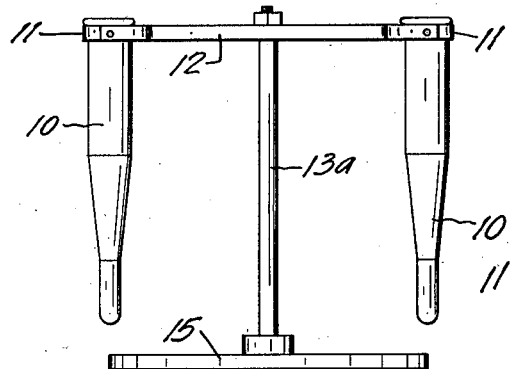
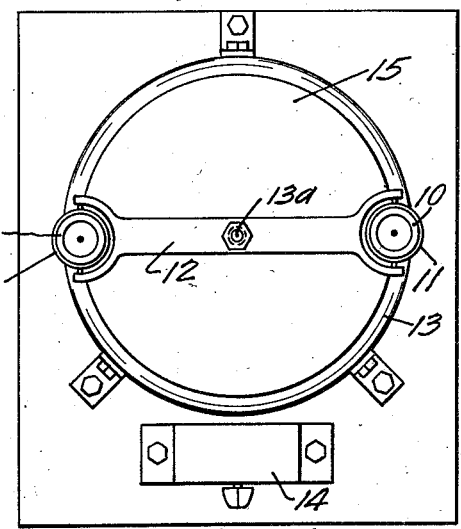
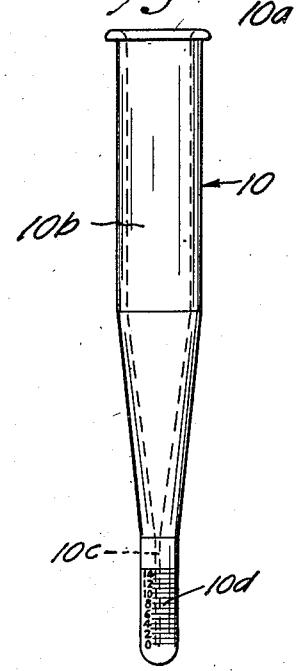
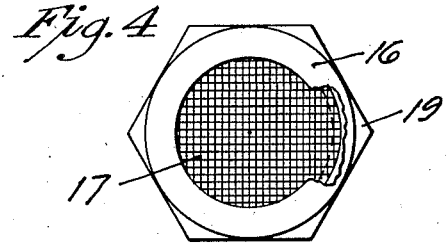
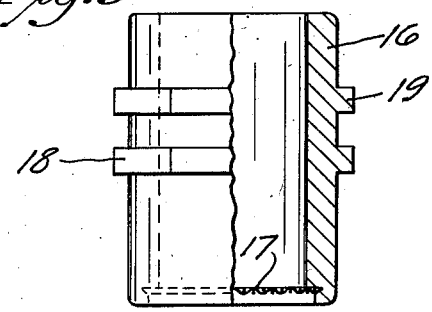
Inventor
Kenneth T. Whitby
By Williamson, Williamson, Schroeder & Adams
Attorneys

United States Patent Office 2,817,970
Patented Dec. 31, 1957

2,817,970

APPARATUS FOR DETERMINING THE PARTICLE SIZE DISTRIBUTION OF FINELY DIVIDED MATERIALS

Kenneth T. Whitby, Minneapolis, Minn., assignor to Pillsbury Mills, Inc., Minneapolis, Minn., a corporation of Delaware Application January 2, 1953, Serial No. 329,411

4 Claims. (Cl. 73—432)

This invention relates to apparatus for measuring particle size distribution of a finely divided material.

It has been a long existing problem to provide a method and apparatus for quickly and by relatively simple computations, determining the particle size distribution of finely divided materials such as mill products and the like in which all of the particles are smaller than 200 microns. In the past, a number of different methods and different types of equipment have been developed for this purpose. However, none of these has yet produced a highly accurate, quickly computed method of determining particle size distribution and most of the apparatus thus far developed is extremely complicated and excessively expensive.

While it is true that sedimentation methods have been used for some time, it has been found that the techniques developed to date have not produced satisfactory accuracy and have required excessive time to complete the procedures presently known. One of the principal problems in producing the necessary accuracy with the known sedimentation methods and equipment has been that of evenly distributing the test sample over the surface of the sedimentation liquid, uneven distribution producing interference between the falling particles during the settling operation and it has also been a problem to prevent density streamers from being produced by the particles falling through the sedimentation liquid which streamers cause interfering turbulences in said liquid and materially affect the accuracy of the results obtained.

It is an object of my present invention to provide a novel and highly accurate apparatus for quickly and easily measuring, by sedimentation according to Stokes' law, particle size distribution of a sample of finely divided material.

It is another object to provide relatively inexpensive apparatus adapted to permit the particle size distribution of a particular material to be quickly and accurately determined.

It is another object to provide apparatus for evenly distributing the particles of a material over the surface of a sedimentation liquid contained within a tube.

It is still another object to provide a sedimentation tube having a diminished lower end portion of a relatively small bore and to combine said sedimentation tube with a centrifuge to produce quick settling of even extremely fine particles and permit direct readings of the volumes of the settled particles to be made on the graduated lower diminished portion of said sedimentation tube.

It is a further object to provide apparatus for evenly dispersing particles in a low concentration over the surface of a sedimentation liquid contained within a sedimentation tube to permit the particle size distribution to be accurately read directly from the graduations at the bottom of the tube and thus, within a matter of a few minutes, obtain an accurate determination of the size distribution of particles of a particular finely divided material.

These and other objects and advantages of this invention will more fully appear from the following description made in connection with the accompanying drawings wherein like reference characters refer to the same or similar parts throughout the several views, and in which:

Fig. 1 is a front elevational view of a centrifuge which embodies a portion of the apparatus;

Fig. 2 is a top plan view thereof;

Fig. 3 is a side elevational view of a sedimentation tube;

Fig. 4 is a top plan view of my dispersing chamber; and

Fig. 5 is a view partially in side elevation and partially in vertical section of said dispersing chamber.

As illustrated in the accompanying drawings, I provide a sedimentation tube, designated as an entirety by the numeral 10, and having an open top 10a with an enlarged cylindrical upper portion 10b with a downwardly tapered hollow inverted conical portion 10e communicating at its upper end with the cylindrical upper chamber and gradually diminishing in size to communicate at its lower end with a diminished capillary bore forming a collection portion 10c at the bottom of the tube. The bottom of said collection portion is of course closed, as best shown in Fig. 3, and a number of depth-indicating graduations 10d are provided which are calibrated to permit the depth of finely divided material collected in said diminished portion 10c to be periodically read directly therefrom.

A centrifuge, designated as an entirety by the letter C, is illustrated in Figs. 1 and 2 and has, in the form shown, a pair of pivoted tube-retaining rings 11 mounted on a rotary arm 12 which is fixed for rotation with a shaft 13a driven by a uniform speed electric motor 13 which, will give controllable and reproducible starting and stopping characteristics such as any well-known hysteresis type synchronous motor. An electric timer 14 of conventional design controls the motor 13 and automatically shuts the same off after a selected time interval has elapsed. A fly wheel 15 is fixed to a portion of the drive shaft 13a to produce a uniform acceleration and deceleration of said shaft to permit accurate computation of the force exerted on the particles settling in the tubes 10.

A substantially cylindrical member 16 is provided for evenly distributing and dispersing a sample of finely divided material into the sedimentation liquid contained in the sedimentation tube 10. The interior chamber of member 16 is cylindrical in shape and has smooth side walls through which the dispersing liquid and particles pass with a minimum of turbulence. The cylindrical side walls within the member 16 define a dispersing chamber, and a dispersing screen 17 is mounted across the lower end of said chamber to restrict the flow of dispersing liquid therethrough. The cylinder 16 has an outside diameter of a size to be received within the open top 10a of the sedimentation tube 10 and an annular collar 18 is provided around an intermediate portion of said member 16 to engage the extreme top periphery of the tube 10 and limit the distance which the member 16 can be inserted into said tube, thus positively positioning the lower dispersing end of the member 16 within the tube 10. In the form shown, the stop collar 18 has a hexagonal outer periphery to facilitate gripping thereof and a gripping collar 19 is mounted around the member 16 in spaced relation above the stop collar 18. The gripping collar 19 is also hexagonal in shape in the form shown and the annular recess formed between the two collars 18 and 19 permits the dispersing chamber to be tightly gripped while handling the same.

The following is a description of the techniques and procedures which I have found to produce the best results. The following procedure has been used with a high degree of success with mill products such as flour and the like. A sample is taken from the material to be analyzed and the dispersing chamber is partially filled therewith. This is done by closing the lower end of said chamber with the finger of the operator. Dispersing liquid is added to the chamber and sufficient space is left within the chamber to permit intermixing of the sample and dispersing liquid by shaking the member 16. The two ends of the chamber are closed by the thumb and another finger of the operator's hand while the operator is shaking said member. Normally, this shaking operation is continued for approximately thirty seconds and thereafter the excess vapor produced thereby is released by removing the top finger from the dispersing chamber and then replacing the top finger and removing the bottom finger to permit the member to be introduced into the top portion of the sedimentation tube which has been filled with sedimentation liquid to a level to engage the lower end of the member 16 when the stop member 18 is engaged against the top periphery of tube 10. As soon as the stop member 18 engages the tube top, the top finger of the operator's hand is removed from the top of said dispersing chamber and the member 18 is withdrawn from the tube 10 with a slight twisting action to cause as little turbulence as possible and thus prevent intermixing of the dispersing liquid with the sedimentation liquid and permit the dispersing of the sample particles evenly over the surface of the sedimentation liquid. As soon as the intermixed sample and dispersing liquid have been discharged into the tube 10, a stop watch is started and readings of the height of material which has settled in the diminished graduated bore 10c at the bottom of tube 10 are taken periodically. The particles of course settle through the sedimentation liquid in accordance with the principles of Stokes' law and the coarser particles will of course settle more rapidly than the finer ones. The settling time of the coarser particles with only the force of gravity acting thereon is relatively short and therefore particles down to approximately 30 microns in size are permitted to settle without applying the added settling force produced by the centrifuge. The tube 10 is of course supported in the retaining ring 11 during the stationary settling period and the weight thereof is counterbalanced by a similar tube 10 received in the opposed retaining ring 11 and filled with liquid of a similar specific gravity to counterbalance the weight of the sedimentation tube containing the sample.

I have found benzine to be an excellent sedimentation liquid for mill products such as flour and the like and of course benzine has a specific gravity of approximately .87. The specific gravity of the dispersing liquid should be at least .05 less than the specific gravity of the sedimentation liquid and I have found that a mixture of 75% benzine and 25% naptha gasoline produces an excellent dispersing liquid for flour and the like. By maintaining a specific gravity differential of .05 between the dispersing liquid and the sedimentation liquid, intermixing of the two liquids can be prevented and the dispersing liquid can be floated on the surface of the sedimentation liquid to to insure even distribution of the particles of the sample intermixed with the dispersing liquid, over the surface of the sedimentation liquid.

Tables may be prepared which indicate the settling time for selected particle sizes and the readings are then taken at the time intervals on the tables, for example:

*Gravity table*

| Particle Size in Microns | Gravity Settling Time, Min.—Sec. |
|---|---|
| 200 | 0:4.7 |
| 160 | 0:7.3 |
| 140 | 0:9.5 |
| 120 | 0:13.0 |
| 100 | 0:18.8 |
| 80 | 0:29.2 |
| 70 | 0:38.1 |
| 60 | 0:52.0 |
| 50 | 1:15 |
| 40 | 1:57 |
| 30 | 3:28 |

*Centrifuge table*

| Particle Size in Microns | Centrifuge Time, Min.—Sec. | Centrifuge Speed, R. P. M. |
|---|---|---|
| 20 | 1:03 | 600 |
| 10 | 3:08 | 600 |
| 5 | 2:21 | 1,200 |
| 1 | 11:37 | 1,800 |

Obviously, the height of the column of particles which has collected in the diminished collection portion 10c at the bottom of sedimentation tube 10 is directly proportional to the volume of particles settled and, therefore, by taking readings at the times set forth in the above tables and thus determining the height of the column of settled particles at the prescribed times, it will be seen that the relative size distributions of the particles can be quickly and easily determined. The following table is a typical particle size distribution computation for a conventional mill product such as cake flour:

| Size in Microns | Column Height in mm. | Difference in Height | Percent in Range | Percent Finer than— |
|---|---|---|---|---|
| 120 | 0 | | | 100.0 |
| | | 1.5 | 6.9 | |
| 100 | 1.5 | | | 93.0 |
| | | 2.2 | 10.1 | |
| 80 | 3.7 | | | 83.0 |
| | | 1.3 | 6.0 | |
| 70 | 5.0 | | | 77.00 |
| | | 1.5 | 6.9 | |
| 60 | 6.5 | | | 70.1 |
| | | 2.0 | 9.2 | |
| 50 | 8.5 | | | 60.9 |
| | | 3.4 | 15.7 | |
| 40 | 11.9 | | | 45.2 |
| | | 2.5 | 11.5 | |
| 30 | 14.4 | | | 33.7 |
| | | 5.5 | 25.4 | |
| 20 | 19.9 | | | 8.3 |
| | | 1.0 | 4.6 | |
| 10 | 20.9 | | | 3.7 |
| | | .8 | 3.7 | |
| 5 | 21.7 | | | 0 |
| | | 0 | 0 | |
| 0 | 21.7 | | | 0 |

It will be seen that I have provided an extremely simple, yet highly efficient, method for accurately measuring and determining the particle size distribution of finely divided material and have produced apparatus for efficiently carrying out said method. Within a matter of relatively few minutes, it is possible to determine the relative volumes of selected particle sizes and to compute in a conventional manner from the height of column readings the "percent in range" and the "percent finer than" as indicated in the above table. It should be noted that the times indicated in the centrifuge table refer to the running time of the centrifuge for each size reading; e. g. the centrifuge is run at 600 R. P. M. for a minute and three seconds to determine the increment of column height for the 20 micron particle size and is run at 1200 R. P. M. for 2 minutes and 21 seconds for the 5 micron particle size reading. In other words, the total running time for the selected classifications of sizes set forth in the gravity table and centrifuge table is the 3 minutes and 28 seconds required for the gravity readings plus the sum total of the times set forth in the centrifuge table, or a total time for each run of approximately 21.5 minutes with only a relatively few minutes required for computing the desired differential figures and percentages.

The method for dispersing mill products onto the sedimentation liquid has been previously described and it should be noted that in certain cases of inorganic materials such as clay or the like which are more difficult to mix with the dispersing liquid it has been found advisable to use a mechanical mixer to thoroughly intermix the particles of the specimen with the dispersing liquid as in a high-speed electric mixer or the like, and a chemical dispersing agent is also frequently desirable. For example, in determining the particle size distribution of a clay sample, the sedimentation liquid is distilled water and the dispersing liquid is a 0.3% saturated solution of sodium silicate in water which permits uniform intermixing of the clay particles therethrough. To obtain the desired specific gravity differential between the sedimentation liquid and the dispersing liquid, 25% of the total volume in the dispersing chamber of acetone is added to the dispersing liquid. Obviously, the tables set forth previously herein would not be applicable to the settling time of particles in distilled water, but rather only to the settling time of selected particle sizes when benzine is used as the sedimentation liquid and the dispersing liquid consists of 75% benzine and 25% naptha gasoline.

My method and apparatus for evenly distributing the particles of a specimen onto the surface of the sedimentation liquid and of thereafter determining the particle size distribution of the specimen as previously set forth herein has proven to be extremely efficient and produces highly accurate results which can be quickly and easily computed to determine the desired particle size relationship percentages and figures of a particular finely divided material.

It will, of course, be understood that various changes may be made in the form, details, arrangement and proportions of the parts without departing from the scope of this invention which, generally stated, consists in the matter shown and described herein and set forth in the appended claims.

What is claimed is:

1. Apparatus for determining the particle size distribution of finely divided material comprising a sedimentation tube defining a sedimentation chamber therewithin and having an open upper end with a closed lower end, the lower portion thereof having a diminished bore to form a particle collecting and indicating column therein, a hollow dispersing member defining a dispersing chamber therewithin, means in the lower portion of said dispersing chamber defining a plurality of discharge openings sufficiently small to permit dispersing liquid to be retained therein by closing the upper end of said dispersing member, said dispersing member being of a size to permit removable insertion into the upper portion of the sedimentation tube and having a stop element to positively position said discharge openings a predetermined distance below the top of said tube at substantially the level to which sedimentation liquid is maintained within said tube to permit the dispersing liquid with the particles of a material sample suspended therein to be uniformly distributed onto the surface of the sedimentation liquid without causing appreciable turbulence of said sedimentation liquid when the upper end of said dispersing member is opened.

2. The structure set forth in claim 1 and said dispersing member being substantially cylindrical in shape with the outside diameter thereof substantially equal to the diameter of the upper portion of said tube to disperse the dispersing liquid and sample particles uniformly and substantially simultaneously in a sharply defined layer on substantially the entire surface area of the sedimentation liquid.

3. The structure set forth in claim 1 and said stop element comprising an outwardly extending shoulder disposed in spaced relation above the lower end of said dispersing member for engagement with the top extremity of sedimentation tube.

4. Apparatus for determining the particle size distribution of finely divided material comprising a sedimentation tube defining a sedimentation chamber therewithin and having an open upper end with a closed lower end, the lower portion having a diminished bore to form a particle collecting and indicating column therein, a hollow dispersing member defining a dispersing chamber therewithin, a screen mounted across the lower portion of said chamber and having the openings therein sufficiently small to permit dispersing liquid to be retained therein by closing the upper end of said dispersing member, said dispersing member being of a size to permit removable insertion into the upper portion of the sedimentation tube and including a stop element to positively position said screen a predetermined distance below the top of said tube at substantially the level to which sedimentation liquid is maintained within said tube to permit the dispersing liquid with the particles of a material sample suspended therein, to be uniformly distributed onto the surface of the sedimentation liquid without causing appreciable turbulence of said sedimentation liquid when the upper end of said dispersing member is opened.

References Cited in the file of this patent
UNITED STATES PATENTS

| 33,171 | Muller | Aug. 27, 1861 |
| 934,833 | Parker | Sept. 21, 1909 |
| 1,648,369 | Svedberg | Nov. 8, 1927 |
| 1,969,081 | Vogel-Jorgensen | Aug. 7, 1934 |
| 2,198,256 | Levy | Apr. 23, 1940 |
| 2,436,083 | Williams et al. | Feb. 17, 1948 |
| 2,597,899 | Payne | May 27, 1952 |

OTHER REFERENCES

Royal Society of London Proceedings, vol. 126, series A, 1930, pp. 427–439, by C. E. Marshall.

Schaar: Catalog No. 50, Selected Laboratory Equipment, p. 74. (Copy in Div. 59.)

Article by Marshall in (Journal of Society of Chemical Industry), vol. 50, 1931. (Cited in applicant's Bibliography to his paper "A General Purpose Centrifuge Sedimentation Method" and made of record in this application March 15, 1954.)